United States Patent [19]

Lieb

[11] Patent Number: 4,914,969
[45] Date of Patent: Apr. 10, 1990

[54] GEAR SHIFTER APPARATUS

[75] Inventor: Philip T. Lieb, Manhattan Beach, Calif.

[73] Assignee: Scat Enterprises, Inc., Redondo Beach, Calif.

[21] Appl. No.: 215,984

[22] Filed: Jul. 7, 1988

[51] Int. Cl.$^4$ ............... F16H 57/06; G05G 9/00; G05G 13/00

[52] U.S. Cl. ................... 74/476; 74/477; 74/566

[58] Field of Search ............ 74/476, 477, 523, 566, 74/473 R

[56] References Cited

U.S. PATENT DOCUMENTS

| D. 209,902 | 1/1968 | Watson | D14/6 |
|---|---|---|---|
| D. 214,786 | 7/1969 | Melluta | D12/14 |
| D. 227,245 | 6/1973 | Hess | D12/16 |
| 1,466,453 | 8/1923 | Manville | 74/477 |
| 1,727,646 | 9/1929 | Hunt et al. | 74/477 |
| 1,908,907 | 5/1933 | Lessler | 74/473 R |
| 2,146,030 | 2/1939 | Schjolin | 74/473 R |
| 3,413,870 | 12/1968 | Spease, Jr. | 74/476 |
| 3,473,404 | 10/1969 | Ross | 74/491 |
| 3,779,096 | 12/1973 | Hurst et al. | 74/476 |
| 3,866,488 | 2/1975 | Nakata et al. | 74/477 |
| 3,974,711 | 8/1976 | Hurst, Jr. | 74/473 R |
| 4,077,275 | 3/1978 | Kluge et al. | 74/473 R |
| 4,118,999 | 10/1978 | Bieber | 74/475 |
| 4,273,004 | 6/1981 | Morrison et al. | 74/473 R |
| 4,569,245 | 2/1986 | Feldt et al. | 74/473 R |

OTHER PUBLICATIONS

"J. C. Whitney Catalog" No. 431 (©) 1983, p. 197, at upper right center of the page.
"Sports Car Graphic", 3./63, p. 62.
Dune Buggies and Hot VW's, 6/85, p. 52, bottom right side of the page.

Primary Examiner—Allan D. Herrmann
Assistant Examiner—Janice Chartoff
Attorney, Agent, or Firm—William W. Haefliger

[57] ABSTRACT

A volkswagen gear shifter includes a frame, a first upright shaft and a universal pivot connecting the shaft to the frame to allow shaft pivoting relative to the frame, a second shaft extending generally parallel to the first shaft, and T-shaped handles on the upper ends of the two shafts; mechanism on the frame is connected with lower ends of the shafts to be manipulated in response to one-handed manipulation of both shafts; brackets connect the second shaft to the first shaft to allow endwise movement of the second shaft relative to the first shaft, the brackets typically include ears rigidly attached to and lengthwise along the side of the first shaft, and guides for the second shaft connected to the ears and offset sidewardly relative to the first shaft, and a flexible shroud or boot extends over the universal pivot and over the lowermost bracket and has a looping head retained by an anchor lip on a base plate.

13 Claims, 3 Drawing Sheets

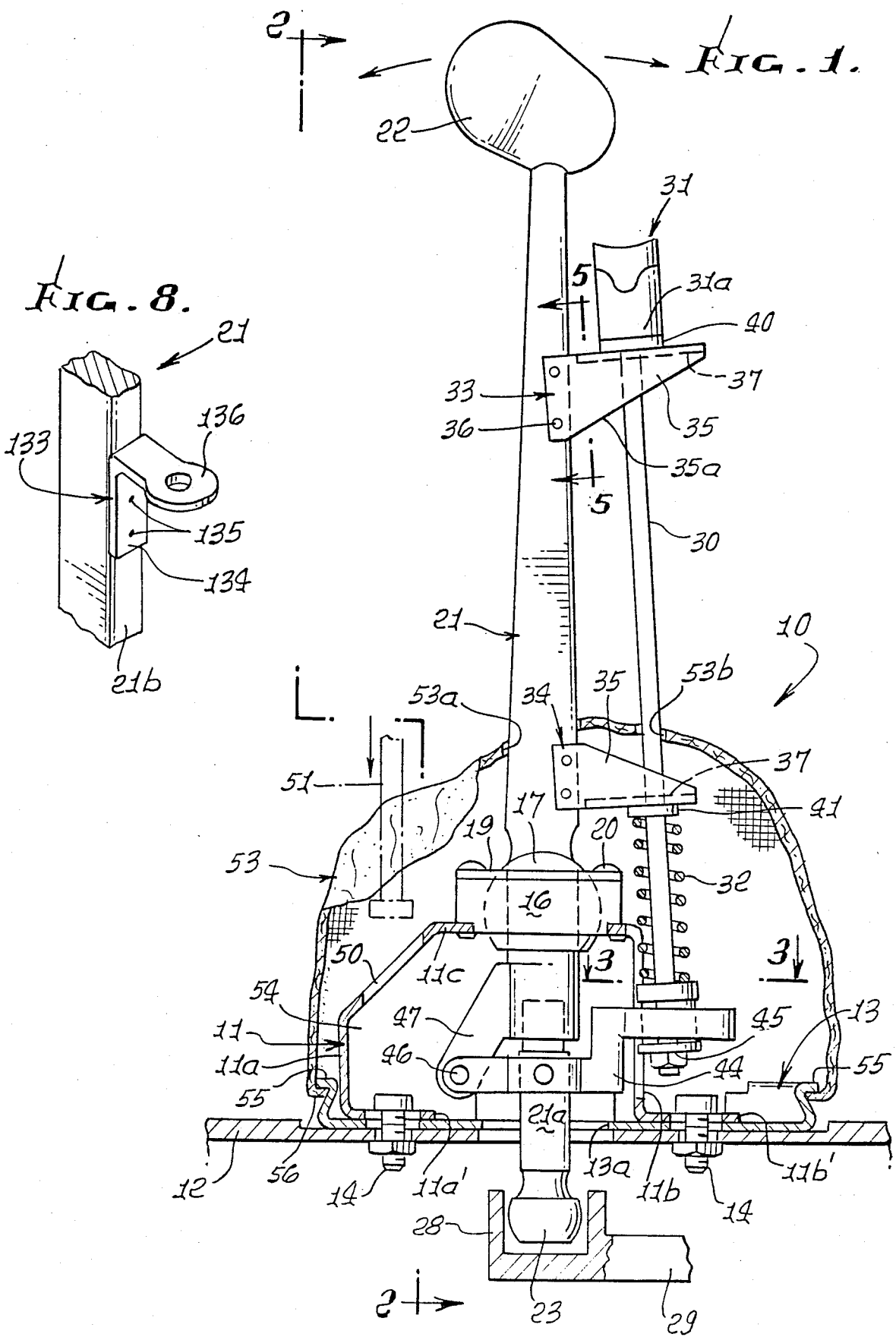

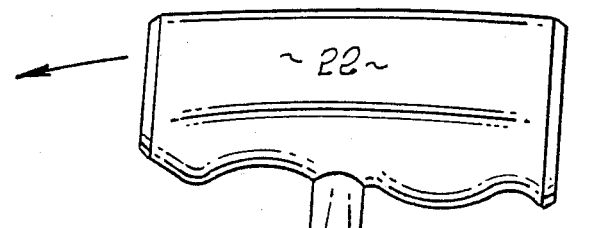
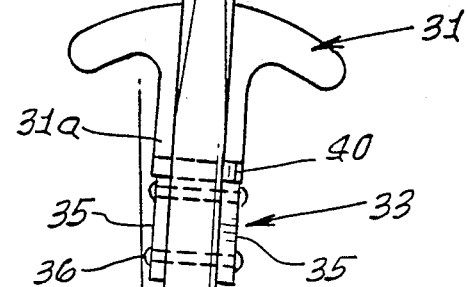
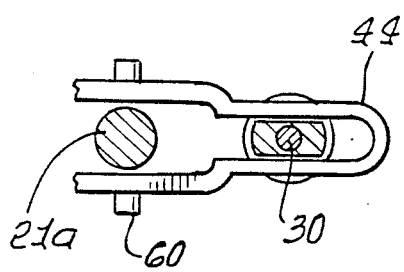
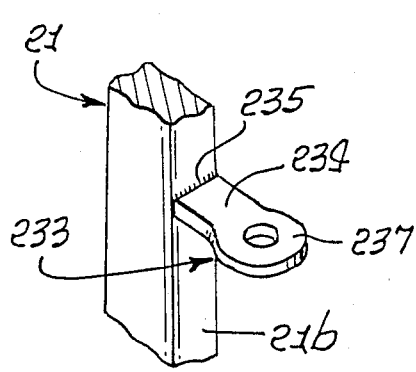
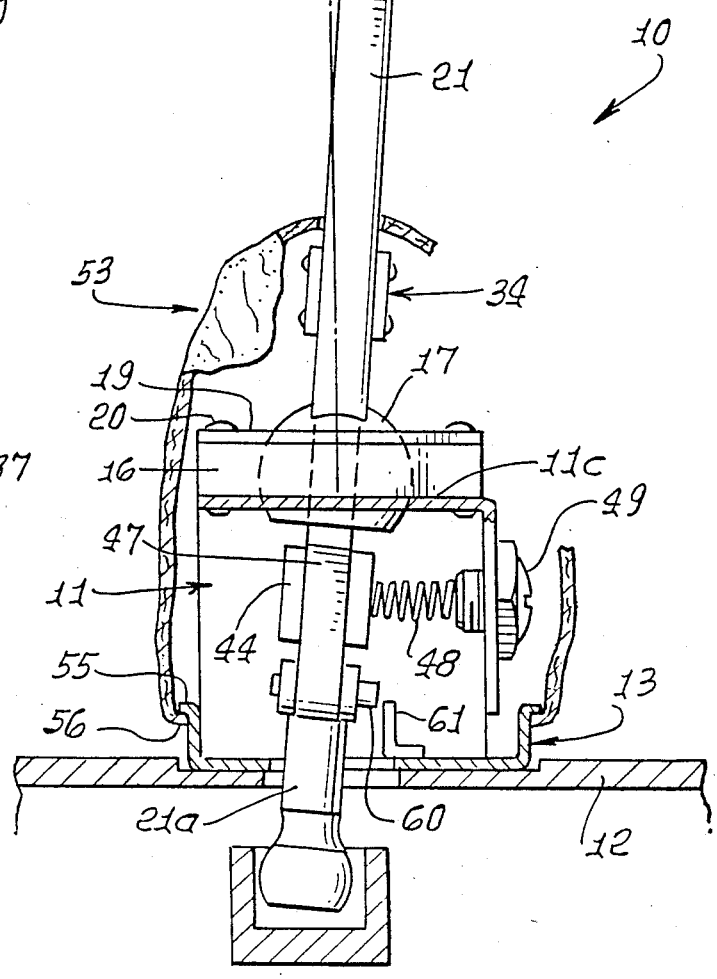

GEAR SHIFTER APPARATUS

BACKGROUND OF THE INVENTION

This invention relates generally to gear shifters for volkswagen vehicle transmissions; and more particularly concerns unusually effective improvements affecting installation and use of such shifters.

There is need for simple, reliable, easily installable, rugged transmission gear shifters for volkswagen vehicles, such as automobiles and vans. Prior shifters lacked the combinations of features of construction, modes of installation and operation, and advantageous results now afforded by the present invention.

SUMMARY OF THE INVENTION

It is a major object of the invention to provide an improved volkswagen vehicle transmission gear shifter meeting the above need. Basically, the environment of the invention comprises a frame, a first upright shaft and a universal pivot connecting the shaft to the frame, to allow shaft pivoting relative to the frame, a second shaft extending generally parallel to the first shaft, T-shaped handles on the upper ends of the two shafts, and a mechanism in the frame connected with lower ends of the shafts to be manipulated in response to one handed manipulation of both shafts. Within this environment, the shifter includes:

(a) bracket means connecting the second shaft to the first shaft to allow endwise movement of the second shaft relative to the first shaft, (b) the bracket means including first ear means rigidly attached to and lengthwise along the side of the first shaft, and a first guide member connected to the ear means and offset sidewardly relative to the first shaft, (c) the first guide member forming a bearing passing the second shaft and allowing said endwise movement thereof.

As will be seen, the bracket means may typically include:

(d) second ear means rigidly attached to and lengthwise along the side of the first shaft, and a second guide member connected to the second ear means and offset sidewardly relative to the first shaft, (e) the second member forming a bearing passing the second shaft and allowing said endwise movement thereof, (f) the first and second ear means spaced apart lengthwise of the first shaft.

Further, the first ear means typically includes two ears attached to opposite sides of the first shaft; and the second ear means includes two ears attached to opposite sides of the first shaft. Each of the ears is generally triangular, having a base portion extending along a side of the first shaft, and a vertex portion integral with the guide member.

Also, the frame typically includes a base plate, and a bracket member attached to the base plate and extending upwardly therefrom and then over the base plate, there being attachment means on the base plate for attaching it to volkswagen floor structure, and the bracket means defining an access opening overlying the attachment means. The frame typically has a portion extending over the base plate to form a chamber, the first upright shaft having a lowermost portion extending below the universal pivot and into the chamber, the second shaft having a lowermost portion extending into the chamber, and gear actuator means is attached to the shaft lowermost portions. The base plate typically has a peripheral anchor lip, and a flexible shroud extends over the bracket plate structure and has a looping bead retained by the anchor lip.

These and other objects and advantages of the invention, as well as the details of an illustrative embodiment, will be more fully understood from the following specification and drawings, in which:

DRAWING DESCRIPTION

FIG. 1 is a side elevation;

FIG. 2 is an end elevation taken on lines 2—2 of FIG. 1;

FIG. 3 is a section taken on lines 3—3 of FIG. 1;

Figure 5:
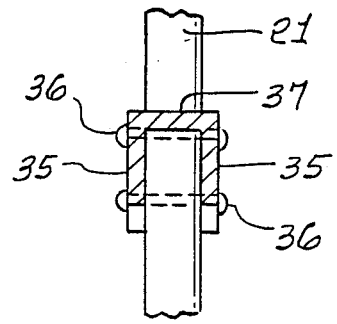

FIG. 5 a section on lines 5—5 of FIG. 1; and

Figure 6:
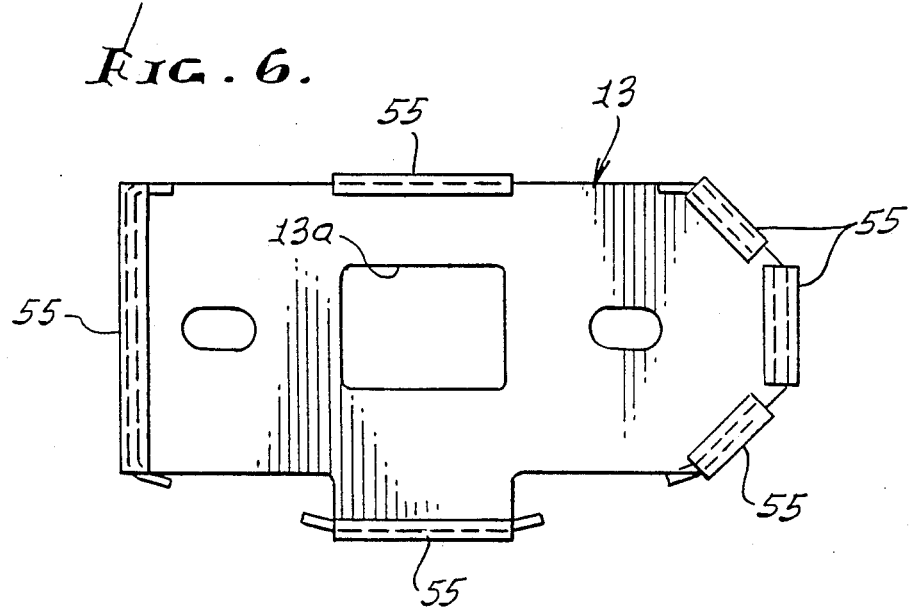

FIG. 6 a plan view of a base plate; and

Figure 7:
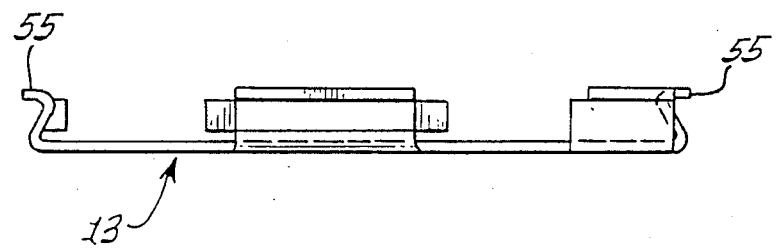

FIG. 7 is a side plan view of FIG. 6; and

FIGS. 8 and 9 are perspective view showing modified brackets and guides.

DETAILED DESCRIPTION

The volkswagen transmission gear shifter 10 is attachable to the floor or transmission housing plate 12 so as to shift transmission gearing, in use. It includes a frame 11 integral with a metallic base plate 13 removably attachable as by fasteners 14 to the floor or plate 12.

The frame 11 includes upright metallic bracket arms 11a and 11b, turned at 11a' and 11b' for attachment to base plate 13, as by welding. A bracket cross-piece 11c, integral with 11a and 11b, extends horizontally above plate 13, and supports a tough, durable plastic socket plate 16. That plate may consist of TEFLON. A TEFLON ball 17 closely fits in the socket to rotate therein, and these elements form a universal pivot. The plate 16 is retained to crosspiece 11c as by retainer plate 19, and fastener 20 extending down through the sandwich formed by 19, 16 and 11c.

A first upright shifter shaft 21 is attached to the ball 17. A transverse metallic T-handle or grip 22 is attached to the top of the shaft; and a shaft extension 21a projects below the ball 17 to terminate at knob or bulb 23. The latter slidably interfits a socket 28 on a gear shifting member 29, whereby member 29 is positioned in accordance with pivoting movement of shaft 21. Such pivoting may move the shaft 21 in an H pattern with an extended horizontal leg and a downward leg pattern, as is well known (first through fourth gear positions for forward drive, and a side position for reverse). Base plate 13 forms a central opening 13a to pass the shaft extension 21a, and allow pivoting of the extension and relative to the frame.

A second shaft or rod 30 (shifting rod) extends generally parallel to the first shaft and has a smaller T-handle 31 attached to its upper end, but below the level of handle 22. The purpose for shaft or rod 30 is to allow shifting into reverse, i.e. when the rod 30 is released to be displaced downwardly by a compression spring 32, whereby pivoting of handle 22 to the right in FIG. 2 is inhibited. First and second brackets 33 and 34 position shaft 30 relative to shaft 21, and in effect connect shaft 30 to shaft 21 to pivot therewith, but allow endwise movement of shaft 30, relative to shaft 21.

Figure 4:
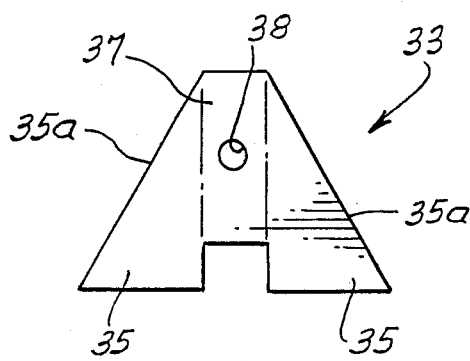
FIG. 4 is a plane view showing a bracket blank to be depressed to the shape as seen in FIG. 1.

For strength and durability, each of the brackets 33 and 34 is generally triangular when formed in blank (see FIG. 4), and includes ear means such as two ears 35 (generally triangular) that are bent to extend lengthwise along opposite sides of the shaft 21, for attachment thereto as by fasteners 36. A guide member 37 is integral with the ears, and is offset relative to the shaft 21 to pass the second shaft 30 and allow endwise movement of same. Ears 35 have edges 35a extending diagonally outwardly as shown, toward the outermost end of member 37, whereby the brackets 33 and 34 are braced to prevent break-off from shaft 30. A hole 38 is formed by each bracket 33 and 34 to pass the shaft rod 30, and annular guide bearings 40 and 41 may be carried by the brackets 33 and 34 to receive and guide the rod 30, as shown. Bearing 40 is downwardly engaged by the lower end 31a of the T-handle 31, and bracket 34 is spaced close to the plate 16, as shown.

Rod 30 extends below bracket 34, and spring 32 extends about the rod to urge it downwardly to the position shown in FIG. 1. A bracket lever 44 is pivotally attached to the lower end of the rod at 45, and is also pivotally attached at 46 to a sideward or diagonally offset part 47 of the shaft extension 21a. Bracket lever 44 is bifurcated as seen in FIG. 3, and extends at opposite sides of the shaft extension 21a. A sideward force exerting compression spring 48 is positioned between shaft extension 21a and a tension adjustment screw 49 on the frame, to urge the shaft extension leftwardly, in FIG. 2. A lug 60 on lever 44 projects as seen in FIG. 2 to engage a flange 61 on the base plate 13, and the rod 30 must be pulled up to allow lug 60 clear flange 61 in order to pivot handle 22 to the right, and back, into reverse position.

It will be seen that removal of the base plate 13 from the vehicle plate 11 is facilitated by access opening 50 in the frame bracket frame 11a, directly above the fastener 14, as shown. This allows downward projection of a tool 51 through opening to gain access to the fastener 14, after upward displacement of a protective boot or shroud 53, which normally covers the frame, and a chamber 54 formed between the frame and the base plate.

An important feature is the provision of a peripheral anchor lip or lips 55 integral with the base plate, and at location about its periphery. The lips project outwardly, and may have Z cross-sections as shown in FIG. 1. See also FIG. 6. The shroud or boot, made for example of leather or similar plastic material, has a lower edge bead 56 that stretches to fit under the lips 55, thereby to retain the boot in downward position, enveloping the frame 11. Lips 55 project upwardly above the horizontal plane of the base plate, as shown, so that the bead 56 is not below the level of the base plate, and therefore easily fits the base plate when the latter is connected to vehicle plate 11.

FIG. 1 also shows that the shroud 53 has two openings 53a and 53b respectively passing the two shafts 21 and 30, above the level of the bracket 34, and allowing endwise movement of shaft 30 relative to shaft 21, but not interfering with the functioning of guide 41 due to ears 35 extending above the level of guide 41. Thus, guide 41 is protectively concealed, and pivoting of both shafts without interference by shroud 53 is facilitated. Note that the shroud has free form above and about the elements 11, 17, 34 and 32.

FIG. 8 illustrates a modified bracket means 133 in the form of a metallic support having a tongue 134 extending adjacent the flat front side 21a of shaft 21. Tongue 134 is spot welded to front side 21a, as at location 135.

An annular guide 136 is integral with the tongue and projects forwardly to guidedly receive and allow endwise movement of shaft 30. Two such bracket means 133 may be provided as substitute for brackets 33 and 34.

FIG. 9 illustrates a modified bracket means 233 in the form of a support 234 having a rearwardly facing end 235 facing and engaging the side 21a of shaft 21. It may be butt welded to that side 21a. Annular guide 237 is integral with support 234 and receives shaft 30. Two such bracket means 233 may be provided as substitute for 33 and 34. Shaft 21 is rectangular is cross-section.

I claim:

1. In a gear shifter, a frame, a first upright shaft and a universal pivot connecting the shaft to the frame, to allow shaft pivoting relative to the frame, a second shaft extending generally parallel to the first shaft, and T-shaped handles on the upper ends of the two shafts, mechanism on the frame connected with lower ends of the shafts to be manipulated in response to one-handed manipulation of both shafts, the improvement comprising:
   (a) bracket means connecting the second shaft to the first shaft to allow endwise movement of the second shaft relative to the first shaft,
   (b) said bracket means including ear means rigidly attached to and lengthwise along the side of the first shaft, and a first guide member connected to the ear means and offset sidewardly relative to the first shaft,
   (c) the first guide member passing the second shaft and allowing said endwise movement thereof,
   (d) the frame including a base plate and bracket plate structure attached to and extending over the base plate to form a chamber, the first upright shaft having a lowermost portion extending below the universal pivot and into the chamber, the second shaft having a lowermost portion extending proximate the chamber, and gear actuator means attached to said shaft lowermost portions, the base plate having upstanding peripheral anchor lip means, and there being a flexible shroud extending over the bracket plate structure and having a looping bead retained by said anchor lip means, and fastener means carried by the base plate at substantially the level of said lip means for attaching the base plate to a floor below which said lowermost portion of the first shaft then projects, the ear means located above the shroud.

2. The improvement of claim 1 wherein said bracket means includes:
   (d) second ear means rigidly attached to and lengthwise along the side of the first shaft, and a second guide member connected to the second ear means and offset sidewardly relative to the first shaft,
   (e) the second member forming a bearing passing the second shaft and allowing said endwise movement thereof,
   (f) said first and second ear means spaced apart lengthwise of the first shaft.

3. The improvement of claim 2 wherein said first ear means includes two ears attached to opposite sides of the first shaft.

4. The improvement of claim 3 wherein said second ear means includes two ears attached to opposite sides of the first shaft.

5. The improvement of claim 1 wherein said ear means is generally triangular, having a base portion extending along the side of the first shaft, and a vertex portion integral with the guide member.

6. The improvement of claim 4 wherein each of said ears is generally triangular, having a base portion extending along a side of the first shaft, and a vertex portion integral with the guide member.

7. The improvement of claim 1 wherein the bracket plate structure defines an access opening overlying said fastener means.

8. The improvement of claim 1 including a compression spring that extends generally parallel to the base plate and is endwise confined between the shaft lowermost portion, and bracket plate means to which it is rigidly connected.

9. In a gear shifter, a frame, a first upright shaft and a universal pivot connecting the shaft to the frame, to allow shaft pivoting relative to the frame, a second shaft extending generally parallel to the first shaft, and T-shaft handles on the upper ends of the two shafts, mechanism in the frame connected with lower ends of the shafts to be manipulated in response to one handed manipulation of both shafts, the improvement comprising: the frame including a base plate and bracket plate structure attached to and extending over the base plate to form a chamber, the first upright shaft having a lowermost portion extending below the universal pivot and into the chamber, the second shaft having a lowermost portion extending near the chamber, and gear actuator means attached to said shaft lowermost portions, the base plate having upstanding peripheral anchor lip means, and there being a flexible shroud extending over the bracket plate structure and having a looping bead retained by said anchor lip means, and fastener means carried by the base plate at substantially the level of said lip means for attaching the base plate to a vehicle floor below which said lowermost portion of the first shaft then projects, and the shroud having two openings respectively passing the two shafts, above the level of said bracket plate structure, the shroud having free form everywhere above the level of said anchor lip means.

10. The combination of claim 9 wherein the bracket plate structure defines an access opening overlying said fastener means.

11. The combination of claim 9 comprising:
 (a) bracket means connecting the second shaft to the first shaft to allow endwise movement of the second shaft relative to the first shaft,
 (b) said first shaft having rectangular cross sections in planes perpendicular to the shaft length, thereby to define a flat side facing the second shaft, said bracket means including a support rigidly attached to the flat side of the first shaft, and a first guide member connected to the support and offset sidewardly relative to the first shaft,
 (c) the first guide member passing the second shaft and allowing said endwise movement thereof.

12. The improvement of claim 11 wherein the support includes a tongue extending adjacent said flat side and spot welded thereto.

13. The improvement of claim 11 wherein the support has an end facing and engaging said flat side, and is butt welded thereto.

* * * * *